United States Patent Office 3,634,435
Patented Jan. 11, 1972

3,634,435
CERTAIN S-(N-METHYLENE-PYRIDONE - (2)-O,O-DILOWER-ALKYL MONO AND DITHIO PHOSPHATES AND DERIVATIVES
Werner Trueb and Fritz Reisser, Therwil, Switzerland, assignors to Sandoz Ltd. (also knokn as Sandoz AG), Basel, Switzerland
No Drawing. Filed July 7, 1969, Ser. No. 839,618
Claims priority, application Switzerland, July 10, 1968, 10,297/68; Jan. 8, 1969, 145/69
Int. Cl. C07d 31/50
U.S. Cl. 260—294.8 K                   18 Claims

ABSTRACT OF THE DISCLOSURE

New S - [N - methylene-pyridone-(2)]-O,O-dialkylthio and dithio-phosphates useful as acaricides and insecticides.

---

The present invention relates to new phosphoric acid esters, methods for their production and to pesticidal compositions containing them.

According to our invention we provide compounds of Formula I,

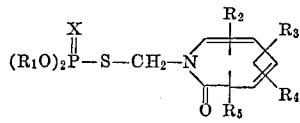

in which $R_1$ signifies alkyl, $R_2$ signifies a hydrogen atom, alkyl, an alkoxy radical containing 1 to 4 carbon atoms, a phenyl, a nitro, or a dialkylamino radical or a halogen atom, $R_3$ signifies a hydrogen atom, alkyl, alkyl substituted by 1 to 3 halogen atoms, or a halogen atom, $R_4$ and $R_5$, which may be the same or different, each signify a hydrogen atom, alkyl, or a halogen atom, X signifies an oxygen or a sulphur atom, "alkyl" signifies an alkyl radical containing 1 to 4 carbon atoms, and "a halogen atom" signifies a halogen atom of atomic number of from 17 to 35.

According to our invention we also provide a process for the production of a compound of Formula I, which comprises reacting a compound of Formula II,

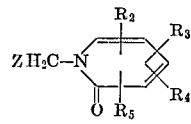

in which $R_2$, $R_3$, $R_4$ and $R_5$ are as defined above, and
Z signifies a chlorine or bromine atom, with a compound of Formula III,

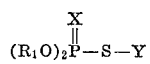

in which

X is as defined above, and
Y signifies an alkali metal or ammonium, in a solvent which is inert under the reaction conditions.

The process may be carried out by dissolving a compound of Formula II, in the organic solvent which is inert under the reaction conditions, for example a hydrocarbon, e.g. benzine, benzene or toluene; a chlorinated hydrocarbon, e.g methylene chloride or chloroform; an ether, e.g. diethyl ether, tetrahydrofuran or dioxane; or a ketone, e.g. acetone or methylisobutylketone, and adding dropwise a compound of Formula III dissolved in an organic solvent which is inert under the reaction conditions (suitably the same solvent as for the compound of Formula II). The reaction may be carried out at about 20–80° C., preferably 20–50° C. The reaction mixture may be kept at this temperature for about 2 to 4 hours and the resulting halide salt subsequently filtered off. After working up in accordance with methods conventional for the working up of similar compounds the product is optionally filtered over a silica gel column. The phosphoric acid esters of the invention are obtained as light yellow oils or in crystalline form.

The compounds of Formula II may be obtained by reacting a compound of Formula IV,

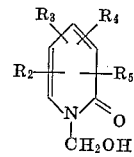

in which $R_2$, $R_3$, $R_4$ and $R_5$ have the above significance, with thionyl chloride or thionyl bromide in a solvent which is inert under the reaction conditions, e.g. chloroform.

The compounds of Formula IV may be produced by reactng a compound of Formula V,

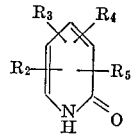

in which $R_2$, $R_3$, $R_4$ and $R_5$ have the above significance, with formaldehyde. The reaction is preferably carried out by dissolving the compound of Formula V, with heating, in an excess of 37% formalin which has been neutralized or made slightly alkaline, allowing the solution to stand for a short time and recrystallizing the crystals obtained after cooling, e.g. from benzene. For the production of some of the substituted pyridones of Formula IV it may be necessary to finely triturate the corresponding compound of Formula V, with an approximately two-fold molar amount of paraformaldehyde, to heat the mixture until a clearly melted material is obtained (135–190° C.) and to maintain the reaction mixture at this temperature for about 10 minutes. The solidified melted material may then be recrystallized, e.g. from benzene.

The compounds of Formulae III and V are either known compounds or may be produced by methods analogous to the methods known for producing the known for producing the known compounds.

Compounds of Formula I which may be mentioned specifically are those in which $R_1$ signifies an ethyl or a methyl group, $R_2$ signifies a hydrogen, chlorine or bromine atom, or a methyl or nitro group, $R_3$ signifies a hydrogen, chlorine or bromine atom or a methyl group, $R_4$ and $R_5$ each represent a hydrogen atom, and X signifies a sulphur atom.

Also worthy of mention are those compounds of Formula I defined immediately above in which, when either of $R_2$ and $R_3$ are other than hydrogen, then $R_2$ and $R_3$ are in the 3, 4 or 5 positions in the pyridone ring. Further, there may be mentioned those compounds of Formula I, in which the pyridone ring has only one or two substituents.

The compounds of general Formula I have insecticidal and/or acaricidal properties. They have an effect against chewing and sucking insects and against spider mites. They also have a low toxicity in warm-blooded animals. The new compounds are therefore indicated for use as pesticides against noxious insects and acarids.

The combating of insects and acarids may be carried out by conventional methods, e.g. by treating the objects to be protected with the active agent, preferably in combination with an agriculturally acceptable diluent or carrier. For use as plant-protecting agent or as pesticide the compound of the invention may be prepared in the form of a dusting or spraying agent, e.g. as a solution or dispersion in water or a suitable organic solvent, e.g. alcohol, petroleum, tar distillates etc., and preferably in combination with an emulsifying agent, e.g. a liquid polyglycol ether derived from a high molecular weight alcohol, mercaptan or alkylphenol and an alkylene oxide. Suitable organic solvents, e.g. ketones, aromatic, optionally halogenated hydrocarbons, mineral oils etc., may also be added to the mixture as solution aids.

The spraying and dusting agents may contain the usual inert carrier materials, e.g. talc, diatomaceous earth, bentonite, pumice, cellulose derivatives and the like, and the usual adhesives and wetting agents to improve adhesiveness and wettability.

The active material of the invention may be present in the formulations as a mixture with other known active agents. Formulations suitable for use in the application of a compound of Formula I to a locus generally contain between 0.02 and 90 percent, and preferably between 0.1 and 20% by weight of active agent depending upon the method of application. Concentrates suitably contain between about 2% and 96% and preferably between 5% and 50% by weight of active ingredient.

The invention is illustrated, but in no way limited by the following examples in which the temperatures are in ° C.

Formulations containing the compounds of the invention may be produced e.g. by

Example (a)

Mixing 25 parts by weight of a compound of Formula I with 25 parts by weight of isooctylphenyldecaglycol ether and 50 parts by weight of xylene, whereby a clear solution is obtained which can easily be emulsified in water. The concentrate is diluted with water to the desired concentration before use;

Example (b)

Mixing 25 parts by weight of a compound of Formula I with 30 parts by weight of isooctylphenyloctaglycol ether and 45 parts by weight of a petroleum fraction having a B.P. of 210–280° C. (D 20°: 0.92). The concentrate is diluted with water to the desired concentration before use;

Example (c)

Mixing 50 parts by weight of a compound of Formula I with 50 parts by weight of isooctylphenyloctaglycol ether. A clear concentrate is obtained which may be readily emulsified in water and which is diluted with water to the desired concentration before use.

Example (d)

Mixing 70.5 parts by weight of diatomaceous earth with 3 parts by weight of sodium lignin sulphonate and 1.5 parts by weight of sodium N-oleyl-N-methyl taurate. The resulting mixture is sprayed with 25 parts by weight of active material and the mixture ground to a fine powder.

The following application examples illustrate the insecticidal and acaricidal effect of the compounds of the invention.

Example (i)

Insecticidal effect against *Bruchidius obtectus* (bean weevil)-contact effect 0.1 to 0.2 cc. of an emulsion produced as in Example (a) and containing 0.0125% of a compound of Formula I are sprayed with a spraying nozzle into a number of 7 cm. diameter petri dishes. The emulsion in the dishes is then dried and Bruchidius imagos are counted into each dish which is then covered with a lid of fine mesh brass gauze. The animals are kept at room temperature without food.

After 48 hours the rate of mortality is determined. Mortality is indicated as a percentage. 100% means that all the bean weevils were killed, 0% means that no bean weevil was killed. The evaluation is indicated in the following Table 1.

TABLE 1

| Active agent | Rate of mortality [1] |
|---|---|
| 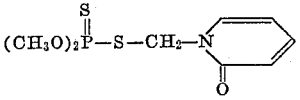 | 100 |
| 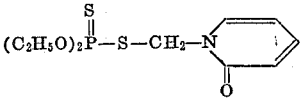 | 100 |
| 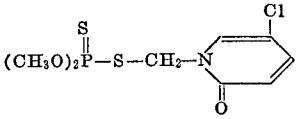 | 100 |
| 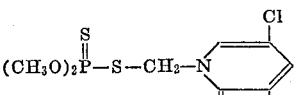 | 90 |
| 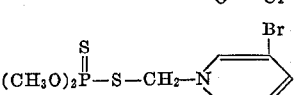 | 100 |
| 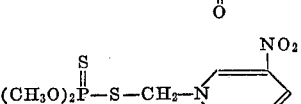 | 100 |
|  | 100 |
| 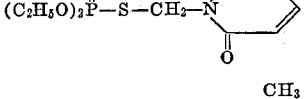 | 100 |

[1] In percent after 48 hours.

EXAMPLE (II)

Insecticidal effect against *Aphis fabae* (black bean aphid)-contact effect

Horse bean plants (*Vicia faba*) are sprayed to run off with a spraying liquor made as in Example (a) containing 0.0125% of active agent. The horse bean plants are then strongly infected with all the forms of development of the black bean aphid (*Aphid fabae*).

After 2 days the rate of mortality is determined. Mortality is indicated as a percentage. 100% means that all the bean aphids were killed, 0% means that no bean aphid was killed. The evaluation is indicated in the following Table 2.

TABLE 2

| Active agent | Rate of mortality [1] |
|---|---|
| $(CH_3O)_2\overset{S}{\overset{\|}{P}}-S-CH_2-N\underset{O}{\diagdown}$ | 100 |
| $(C_2H_5O)_2\overset{S}{\overset{\|}{P}}-S-CH_2-N\underset{O}{\diagdown}$ | 100 |
| $(CH_3O)_2\overset{S}{\overset{\|}{P}}-S-CH_2-N\underset{O}{\diagdown}\;Cl$ | 100 |
| $(C_2H_5O)_2\overset{S}{\overset{\|}{P}}-S-CH_2-N\underset{O}{\diagdown}\;Cl$ | 90 |
| $(CH_3O)_2\overset{S}{\overset{\|}{P}}-S-CH_2-N\underset{O}{\diagdown}\;Br$ | 100 |
| $(C_2H_5O)_2\overset{S}{\overset{\|}{P}}-S-CH_2-N\underset{O\;CH_3}{\diagdown}$ | 100 |
| $(CH_3O)_2\overset{S}{\overset{\|}{P}}-S-CH_2-N\underset{O}{\diagdown}-CH_3$ | 100 |
| $(CH_3O)_2\overset{S}{\overset{\|}{P}}-S-CH_2-N\underset{O}{\diagdown}\;CH_3$ | 100 |

[1] In percent after 48 hours.

EXAMPLE (III)

Insecticidal effect against *Carausius morosus* (Indian rod locust)-feed effect

Tradescantia branches are immersed for 3 seconds in an emulsion, made as in Example (a) and containing 0.0125% of a compound of Formula I. After drying the covering each of the Tradescantia branches is inserted into a small glass tube filled with water, and this is placed in a glass dish. Then Carausius larvae in the second stage of development are counted into each dish which is then closed with a wire mesh lid.

After 5 days the rate of mortality is determined by counting out the live and dead animals. The rate of mortality is indicated as a percentage. 100% means that all the rod locusts were killed, 0% means that no rod locust was killed. The evaluation is indicated in the following Table 3.

TABLE 3

| Active agent | Rate of mortality [1] |
|---|---|
| $(CH_3O)_2\overset{S}{\overset{\|}{P}}-S-CH_2-N\underset{O}{\diagdown}$ | 100 |
| $(C_2H_5O)_2\overset{S}{\overset{\|}{P}}-S-CH_2-N\underset{O}{\diagdown}$ | 100 |
| $(CH_3O)_2\overset{S}{\overset{\|}{P}}-S-CH_2-N\underset{O}{\diagdown}\;Cl$ | 100 |
| $(C_2H_5O)_2\overset{S}{\overset{\|}{P}}-S-CH_2-N\underset{O}{\diagdown}\;Cl$ | 100 |
| $(CH_3O)_2\overset{S}{\overset{\|}{P}}-S-CH_2-N\underset{O}{\diagdown}\;Br$ | 100 |
| $(CH_3O)_2\overset{S}{\overset{\|}{P}}-S-CH_2-N\underset{O\;Br}{\diagdown}\;Br$ | 90 |
| $(C_2H_5O)_2\overset{S}{\overset{\|}{P}}-S-CH_2-N\underset{O\;Br}{\diagdown}\;Br$ | 100 |
| $(CH_3O)_2\overset{S}{\overset{\|}{P}}-S-CH_2-N\underset{O}{\diagdown}\;NO_2$ | 100 |
| $(C_2H_5O)_2\overset{S}{\overset{\|}{P}}-S-CH_2-N\underset{O}{\diagdown}\;NO_2$ | 100 |
| $(CH_3O)_2\overset{S}{\overset{\|}{P}}-S-CH_2-N\underset{O}{\diagdown}-CH_3$ | 100 |
| $(CH_3O)_2\overset{S}{\overset{\|}{P}}-S-CH_2-N\underset{O}{\diagdown}\;CH_3$ | 100 |

[1] In percent after 5 days.

EXAMPLE (IV)

Insecticidal effect against *Ephestia Kuehniella* (flour moth)-contact effect

Petri dishes having a diameter of 7 cm., each containing 10 Kuehniella caterpillars having a length of 10 to 12 mm., are sprayed by means of a spraying nozzle with an emulsion made as in Example (a) and containing 0.05% of the active agent of Formula I, so that each dish contains from 0.1 to 0.2 cc. of emulsion. The dishes are then covered with a lid of fine mesh brass gauze. After drying the emulsion in the dishes a wafer is given as food and renewed as required.

After 5 days the rate of mortality is determined as a percentage by counting out the live and dead animals. 100% means that all the caterpillars were killed, 0% means that no caterpillar was killed. The evaluation is indicated in the following Table 4.

TABLE 4

| Active agent | Rate of mortality [1] |
|---|---|
| $(CH_3O)_2\overset{S}{\overset{\|}{P}}-S-CH_2-N$ (2-oxopyridinyl) | 100 |
| $(C_2H_5O)_2\overset{S}{\overset{\|}{P}}-S-CH_2-N$ (2-oxopyridinyl) | 100 |
| $(CH_3O)_2\overset{S}{\overset{\|}{P}}-S-CH_2-N$ (Cl-substituted 2-oxopyridinyl) | 100 |
| $(C_2H_5O)_2\overset{S}{\overset{\|}{P}}-S-CH_2-N$ (Cl-substituted 2-oxopyridinyl) | 100 |
| $(CH_3O)_2\overset{S}{\overset{\|}{P}}-S-CH_2-N$ (Br-substituted 2-oxopyridinyl) | 100 |
| $(CH_3O)_2\overset{S}{\overset{\|}{P}}-S-CH_2-N$ (CH$_3$-substituted 2-oxopyridinyl) | 100 |
| $(CH_3O)_2\overset{S}{\overset{\|}{P}}-S-CH_2-N$ (4-CH$_3$-2-oxopyridinyl) | 100 |
| $(C_2H_5O)_2\overset{S}{\overset{\|}{P}}-S-CH_2-N$ (4-CH$_3$-2-oxopyridinyl) | 90 |
| $(CH_3O)_2\overset{S}{\overset{\|}{P}}-S-CH_2-N$ (3-CH$_3$-2-oxopyridinyl) | 100 |

[1] In percent after 5 days.

EXAMPLE V

Acaricidal effect against *Tetranychus telarius* (spider mite)-contact effect

Bean plants (*Phaseolus vulgaris*) are sprayed to run off with an emulsion made as in Example (a) and containing 0.0125% of the active agent of Formula I. These bean plants are strongly infected with all stages of development of the spider mite (*Tetranychus telarius*).

After 2 days the rate of mortality is determined as a percentage by counting out the live and dead mites. Mortality is indicated as a percentage. 100% means that all the spider mites were killed, 0% means that no spider mite was killed. The evaluation is indicated in the following Table 5.

TABLE 5

| Active agent | Rate of mortality [1] |
|---|---|
| $(CH_3O)_2\overset{S}{\overset{\|}{P}}-S-CH_2-N$ (2-oxopyridinyl) | 100 |
| $(CH_3O)_2\overset{S}{\overset{\|}{P}}-S-CH_2-N$ (Cl-substituted 2-oxopyridinyl) | 100 |
| $(CH_3O)_2\overset{S}{\overset{\|}{P}}-S-CH_2-N$ (Br-substituted 2-oxopyridinyl) | 100 |
| $(CH_3O)_2\overset{S}{\overset{\|}{P}}-S-CH_2-N$ (4-CH$_3$-2-oxopyridinyl) | 100 |
| $(CH_3O)_2\overset{S}{\overset{\|}{P}}-S-CH_2-N$ (3-CH$_3$-2-oxopyridinyl) | 100 |

[1] In percent after 2 days.

EXAMPLE (VI)

Acaricidal effect against *Tetranychus telarius* (spider mite)-ovicidal effect

Two days before treatment, 12 to 15 female Tetranychus are placed on a 2 cm. diameter ring of insect paste on a bush bean leaf, to lay eggs. The female mites lay 20 to 30 eggs in 30 hours. One day before the treatment the female mites are removed and the leaves are cut off from the plant and the stems are introduced in a small glass tube filled with water.

The bush bean leaves, containing 1 to 2 day old eggs, are immersed for 3 seconds in an emulsion, made as in Example (a) and containing 0.05% of a compound of Formula I. The leaves are kept in a dish at room temperature for 6 days.

After 6 days the hatched and unhatched eggs are counted out. The evaluation of the ovicidal effect is indicated as a percentage in Table 6.

TABLE 6

| Active agent | Rate of mortality [1] |
|---|---|
| $(CH_3O)_2\overset{S}{\overset{\|}{P}}-S-CH_2-N$ (Br-substituted 2-oxopyridinyl) | 100 |
| $(CH_3O)_2\overset{S}{\overset{\|}{P}}-S-CH_2-N$ (4-CH$_3$-2-oxopyridinyl) | 100 |
| $(CH_3O)_2\overset{S}{\overset{\|}{P}}-S-CH_2-N$ (3-CH$_3$-2-oxopyridinyl) | 100 |

[1] In percent after 6 days.

EXAMPLE 1

Production of S-[N-methylene-pyridone-(2)]-O,O-dimethyl-dithiophosphate 14.4 g. (0.1 mol) of N-chloromethyl-pyridone-(2) are dissolved in 200 cc. of anhydrous acetone and 18 g. (0.1 mol) of sodium dimethyl-dithiophosphate are added. The reaction mixture is stirred at 50° for 2 hours, the resulting common salt is then filtered off and the filtrate is concentrated by evaporation. The resulting oil is taken up in chloroform, is washed thrice with water, dried and subsequently kept at 60° in a high vacuum (0.1 mm. of Hg) for 2 hours. The resulting product is purified over a silica gel acid. A practically colourless oil, which cannot be distilled, is obtained. The compound has an Rƒ value of 0.50 at 23° (paper chromatogram on Whatmann No. 1 paper, which has been impregnated with acetone containing 12% of formamide) (eluant: toluene/isooctane 1:1).

*Analysis.*—$C_8H_{12}NO_3PS_2$ (molecular weight, 265.3). Calcd. (percent): C, 36.2; H, 4.5; N, 5.3; S, 24.1. Found (percent): C, 35.8; H, 4.6; N, 5.0; S, 24.0.

EXAMPLE 2

Production of S-[N-methylene-pyridone-(2)]-O,O-diethyl-dithiophosphate 14.4 g. (0.01 mol) of N-chloromethyl-pyridone-(2) are dissolved in 200 cc. of anhydrous acetone and 20.8 g. (0.1 mol) of sodium diethyl-dithiophosphate are added. The reaction mixture is stirred at 50° for 3½ hours, the resulting common salt is then filtered off and the filtrate is concentrated by evaporation. The oily residue is taken up in chloroform, is washed thrice with water, dried and filtered over a silica gel acid. After removing the solvent, a light yellow oil, which cannot be distilled, is obtained. The compound has a Rƒ value of 0.84 at 23°, determined in a manner analogous to that indicated in Example 1.

*Analysis.*—$C_{10}H_{16}NO_3PS_2$ (molecular weight, 293.3). Calcd. (percent): C, 40.9; H, 5.5; N, 4.8; S, 21.5. Found (percent): C, 40.2; H, 5.6; N, 4.1; S, 22.1.

EXAMPLE 3

Production of S-[N-methylene-3,5-dichloro-pyridone-(2)]-O,O-diethyl-dithiophosphate 21.3 g. (0.1 mol) of N-chloromethyl-3,5-dichloropyridone-(2) are dissolved in 200 cc. of absolute tetrahydrofuran and 22 g. (0.105 mol) of sodium diethyl-dithiophosphate are added. The reaction mixture is stirred at 50° for 4 hours and is then concentrated by evaporation in a vacuum. The residue is taken up in ether, is washed with water, dried with sodium sulphate and concentrated by evaporation. The resulting S-[N-methylene-3,5-dichloro-pyridone-(2)]-O,O-diethyl-dithiophosphate has a M.P. of 51–53° after recrystallization from chloroform/petroleum ether.

*Analysis.*—$C_{10}H_{14}Cl_2NO_3PS_2$ (molecular weight, 362.2). Calcd. (percent): C, 33.2; H, 3.9; Cl, 19.6; N, 3.9; P, T.6; S, 17.7. Found (percent): C, 33.6; H, 3.9; Cl, 20.2; N, 4.3; P, 8.3; S, 17.8.

The following compounds of general Formula I may be obtained in a manner analogous to that described in Examples 1 to 3.

| Ex. | Compound | Empirical formula | Molecular weight | Melting point, °C. | Calculated C | H | Br | Cl | N | P | S | Found C | H | Br | Cl | N | P | S |
|---|---|---|---|---|---|---|---|---|---|---|---|---|---|---|---|---|---|---|
| 4 | S-[N-methylene-5-chloro-pyridone-(2)]-O,O-dimethyl-dithiophosphate. | $C_8H_{11}ClNO_3PS_2$ | 299.8 | Oil | 32.1 | 3.7 | | 11.8 | 4.7 | 10.3 | 21.4 | 33.1 | 3.5 | | 12.4 | 4.2 | 9.0 | 20.4 |
| 5 | S-[N-methylene-5-chloro-pyridone-(2)]-O,O-diethyl-dithiophosphate. | $C_{10}H_{15}ClNO_3PS_2$ | 327.8 | Oil | 36.4 | 4.6 | | 10.8 | 4.3 | 9.4 | 19.6 | 36.1 | 4.3 | | 11.3 | 4.3 | 9.1 | 19.1 |
| 6 | S-[N-methylene-3,5-dichloro-pyridone-(2)]-O,O-dimethyl-dithiophosphate. | $C_8H_{10}Cl_2NO_3PS_2$ | 334.0 | 72–75 | 28.8 | 3.0 | | 21.2 | 4.2 | 9.3 | | 29.2 | 3.2 | | 22.1 | 4.5 | 8.7 | |
| 7 | S-[N-methylene-5-bromo-pyridone-(2)]-O,O-dimethyldithiophosphate. | $C_8H_{11}BrNO_3PS_2$ | 344.2 | Oil | 27.9 | 3.2 | 23.2 | | 4.1 | 9.0 | 18.6 | 27.6 | 3.5 | 24.3 | | 3.8 | 9.3 | 18.2 |
| 8 | S-[N-methylene-3,5-dibromopyridone-(2)]-O,O-dimethyldithiophosphate. | $C_8H_{10}Br_2NO_3PS_2$ | 423.1 | 109–111 | 22.7 | 2.4 | 37.8 | | 3.3 | 7.3 | 15.1 | 22.7 | 2.4 | 27.7 | | 3.6 | 7.0 | 14.7 |
| 9 | S-[N-methylene-dibromo-pyridone-(2)]-O,O-diethyl-dithiosphate. | $C_{10}H_{14}Br_2NO_3PS_2$ | 451.1 | 64–66 | 26.6 | 3.1 | 35.4 | | 3.1 | 6.9 | 14.2 | 26.8 | 3.1 | 36.3 | | 3.4 | 6.1 | 13.8 |
| 10 | S-[N-methylene-5-nitro-pyridone-(2)]-O,O-dimethyl-dithiophosphate. | $C_8H_{11}N_2O_5PS_2$ | 310.3 | 86–88 | 31.0 | 3.6 | | | 9.0 | 10.0 | 20.7 | 30.7 | 3.4 | | | 8.3 | 10.3 | 20.8 |
| 11 | S-[N-methylene-5-nitro-pyridone-(2)]-O,O-diethyl-dithiophosphate. | $C_{10}H_{15}N_2O_5PS_2$ | 338.4 | 62–64 | 35.5 | 4.5 | | | 8.3 | 9.2 | 19.0 | 35.9 | 4.7 | | | 8.2 | 9.6 | 18.6 |
| 12 | S-[N-methylene-3-methyl-pyridone-(2)]-O,O-dimethyl-dithiophosphate. | $C_9H_{14}NO_3PS_2$ | 279.3 | Oil | 38.7 | 5.1 | | | 5.0 | 11.1 | 22.9 | 38.3 | 4.9 | | | 4.6 | 9.6 | 22.2 |
| 13 | S-[N-methylene-3-methyl-pyridone-(2)]-O,O-diethyl-dithiophosphate. | $C_{11}H_{18}NO_3PS_2$ | 307.4 | Oil | 43.0 | 5.9 | | | 4.6 | 10.1 | 20.9 | 42.6 | 6.0 | | | 4.5 | 9.4 | 20.2 |
| 14 | S-[N-methylene-4-methyl-pyridone-(2)]-O,O-dimethyl-dithiophosphate. | $C_9H_{14}NO_3PS_2$ | 279.3 | Oil | 38.7 | 5.1 | | | 5.0 | 11.1 | 22.9 | 37.9 | 4.9 | | | 4.7 | 9.9 | 22.0 |

| Ex. | Compound | Empirical formula | Molecular weight | Melting point, °C. | Analysis (percent) Calculated | | | | | | | Found | | | | | | |
|---|---|---|---|---|---|---|---|---|---|---|---|---|---|---|---|---|---|---|
| | | | | | C | H | Br | Cl | N | P | S | C | H | Br | Cl | N | P | S |
| 15 | S-[N-methylene-4-methyl-pyridone-(2)]-O,O-diethyl-dithiophosphate. | $C_{11}H_{18}NO_3PS_2$ | 307.4 | Oil | 43.0 | 5.9 | | | 4.6 | 10.1 | 20.9 | 42.6 | 6.0 | | | 4.5 | 10.0 | 20.4 |
| 16 | S-[N-methylene-5-methyl-pyridone-(2)]-O,O-dimethyl-dithiophosphate. | $C_9H_{14}NO_3PS_2$ | 279.3 | Oil | 38.7 | 5.1 | | | 5.0 | 11.1 | 22.9 | 37.9 | 5.1 | | | 4.7 | 10.8 | 22.0 |
| 17 | S-[N-methylene-5-methyl-pyridone-(2)]-O,O-diethyl-dithiophosphate. | $C_{11}H_{18}NO_3PS_2$ | 307.4 | Oil | 43.0 | 5.9 | | | 4.6 | 10.1 | 20.9 | 42.5 | 5.9 | | | 4.5 | 9.5 | 20.3 |

EXAMPLE 18

Production of compounds of Formula IV (A) PRODUCTION OF N-HYDROXYMETHYL-3-METHYL-PYRIDONE - (2) (HYDROXYMETHYLATION WITH FORMALIN)

20 cc. of 37% formalin (adjusted to pH 8 with triethylamine) are added to 10.9 g. (0.1 mol) of 3-methyl-pyridone-(2). The compound dissolves with slight heating. Upon cooling, the resulting N-hydroxymethyl-3-methylene-5-chloro - pyridone-(2)]-O,O - diethyl -dithio-M.P. of 132–134° after recrystallization from benzene.

(B) PRODUCTION OF N-HYDROXYMETHYL-5-METHYL-PYRIDONE - (2) (HYDROXYMETHYLATION WITH PARAFORMALDEHYDE 10.9 g. (0.1 mol) of 5-methyl-pyridone-(2) are mixed well with 6 g. of paraformaldehyde and the mixture is heated to 190°. The cooled melted material is recrystallized from benzene. The resulting N-hydroxymethyl-5-methyl-pyridone-(2) has a M.P. of 74–76°.

The following compounds of general Formula IV are obtained in a manner analogous to that described in Examples A and B.

| Compound | Method of production | Melting point, °C |
|---|---|---|
| N-hydroxymethyl-3,5-dichloro-pyridone-(2) | A | 144–146 |
| N-hydromethyl-5-bromo-pyridone-(2) | B | 90–92 |
| N-hydroxymethyl-3,5-dibromo-pyridone-(2) | A | 179–181 |
| N-hydroxymethyl-5-nitro-pyridone-(2) | A | [1] 170 |
| N-hydroxymethyl-4-methyl-pyridone-(2) | A | 130–132 |

[1] Decomp.

EXAMPLE 19

PRODUCTION OF COMPOUNDS OF FORMULA II

N-CHLOROMETHYL-PYRIDONE-(2)

125 g. of N-hydroxymethyl-pyridone-(2) are dissolved in 200 cc. of absolute chloroform and 119.0 g. of thionyl chloride are slowly added at −10 to −5° while stirring. The reaction mixture first dissolves completely and after some time a small amount of precipitate is formed. The mixture is stirred at 60° overnight, is then cooled and filtered. The filtrate is concentrated by evaporation in a vacuum. A brown oil, which can be distilled in a high vacuum, is obtained. B.P. 78° (4.10⁻⁴ mm. of Hg), M.P. 54–56°.

N-CHLOROMETHYL-5-NITRO-PYRIDONE-(2)

17 g. (0.1 mol) of N-hydroxymethyl-5-nitro-pyridone-(2) are dissolved in 250 cc. of chloroform and boiled under reflux for 4 hours with 13.1 g. (0.11 mol) of thionyl chloride and 3 cc. of dimethyl formamide. The solution is then concentrated by evaporation and the crystalline residue recrystallized from chloroform/petroleum ether. The resulting N-chloromethyl-5-nitro-pyridone-(2) has a M.P. of 120–122°.

The following compounds of general Formula II are obtained in a manner analogous to that described above.

| Compound: | Melting point |
|---|---|
| N-chloromethyl-5-chloro-pyridone-(2) | 103–105 |
| N-chloromethyl-3,5-dichloro-pyridone - (2) | 111–113 |
| N-chloromethyl-5-bromo-pyridone-(2) | 109–111 |
| N-chloromethyl-3,5-dibromo-pyridone- (2) | 133–135 |
| N-chloromethyl-3-methyl-pyridone-(2) | 116–118 |
| N-chloromethyl-4-methyl-pyridone-(2) | 84–85 |
| N-chloromethyl-5-methyl-pyridone-(2) | 117–119 |

What is claimed is:

1. A compound of formula

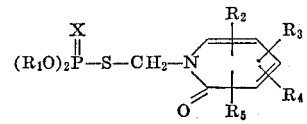

in which $R_1$ signifies alkyl, $R_2$ signifies hydrogen, alkyl, alkoxy containing 1 to 4 carbon atoms, or halogen, $R_3$ signifies hydrogen, alkyl, alkyl substituted by 1 to 3 halogens, or halogen, $R_4$ and $R_5$, which may be the same or different, each signify hydrogen, alkyl or halogen, X signifies oxygen or sulphur, "alkyl" signifies alkyl containing 1 to 4 carbon atoms and "halogen" signifies a halogen atom of atomic number of from 17 to 35.

2. A compound as claimed in claim 1, wherein $R_1$ signifies ethyl or methyl, $R_2$ signifies hydrogen, chlorine, bromine or methyl, $R_3$ signifies hydrogen, chlorine, bromine or methyl, $R_4$ and $R_5$ each represent hydrogen, and X signifies sulphur, 3. A compound as claimed in claim 2, wherein, when either of $R_2$ and $R_3$ are other than hydrogen then $R_2$ and $R_3$ are in the 3, 4 or 5 positions in the pyridone ring.

4. A compound as claimed in claim 1, which is S-[N-methylene-pyridone-(2)]-O,O-dimethyl-dithiophosphate.

5. A compound as claimed in claim 1, which is S-[N-methylene-pyridone-(2)]-O,O-dimethyl-dithiophosphate.

6. A compound as claimed in claim 1, which is S-[N-methylene-3,5 - dichloro - pyridone - (2)] - O,O - diethyl-dithiophosphate.

7. A compound as claimed in claim 1, which is S-[N-methylene-5-chloro-pyridone-(2)]-O,O-dimethyl - dithiophosphate.

8. A compound as claimed in claim 1, which is S-[N-methylene-5-chloro-pyridone - (2)] - O,O - diethyl - dithiophosphate.

9. A compound as claimed in claim 1, which is S-[N-methylene-3,5-dichloro - pyridone - (2)] - O,O - dimethyl-dithiophosphate.

10. A compound as claimed in claim 1, which is S-[N-methylene-5-bromo-pyridone-(2)]-O,O-dimethyl - dithiophosphate.

11. A compound as claimed in claim 1, which is S-[N-methylene-3,5-dibromo - pyridone - (2)] - O,O - dimethyl-dithiophosphate.

12. A compound as claimed in claim 1, which is S-[N-methylene-3,5-dibromo-pyridone-(2)]-O,O-diethyl-dithiophosphate.

13. A compound as claimed in claim 1, which is S-[N-methylene-3-methyl-pyridone-(2)]-O,O-dimethyl-dithiophosphate.

14. A compound as claimed in claim 1, which is S-[N-methylene-3-methyl-pyridone-(20)]-O,O-diethyl-dithiophosphate.

15. A compound as claimed in claim 1, which is S-[N-methylene-4-methyl-pyridone-(2)]-O,O-dimethyl-dithiophosphate.

16. A compound as claimed in claim 1, which is S-[N-methylene-4-methyl-pyridone-(2)]-O,O-diethyl-dithiophosphate.

17. A compound as claimed in claim 1, which is S-[N-methylene-5-methyl-pyridone-(2)]-O,O-dimethyl-dithiophosphate.

18. A compound as claimed in claim 1, which is S-[N-methylene-5-methyl-pyridone-(2)]-O,O-diethyl-dithiophosphate.

References Cited

FOREIGN PATENTS 6714490   4/1968   Netherlands _____ 260—294.8 K

ALAN L. ROTMAN, Primary Examiner

U.S. Cl. X.R.

260—296 R, 297 Z; 424—263